United States Patent [19]

Gloser et al.

[11] Patent Number: 5,054,343

[45] Date of Patent: Oct. 8, 1991

[54] TABLE OF TURRET LATHE

[75] Inventors: Wolfgang Gloser, Börtlingen; Siegfried Kuhn, Dürnau; Robert Räder, Göppingen-Faurndau; Friedhelm Setzer, Göppingen, all of Fed. Rep. of Germany

[73] Assignee: Boehringer Werkzeugmaschinen GmbH, Göppingen, Fed. Rep. of Germany

[21] Appl. No.: 237,525

[22] Filed: Aug. 26, 1988

Related U.S. Application Data

[63] Continuation-in-part of Ser. No. 511,349, May 20, 1983, abandoned.

[30] Foreign Application Priority Data

Sep. 21, 1981 [DE] Fed. Rep. of Germany ....... 3137514
Sep. 21, 1982 [DE] Fed. Rep. of Germany ........... PCT/EP82/00210

[51] Int. Cl.$^5$ ............................................. B23B 29/00
[52] U.S. Cl. ......................................... 82/159; 82/121
[58] Field of Search ............... 82/159, 158, 173, 120, 82/121, 123

[56] References Cited

U.S. PATENT DOCUMENTS 4,286,483  9/1981  Henneberg et al. .................. 82/159

Primary Examiner—Frederick R. Schmidt
Assistant Examiner—Lawrence Cruz

[57] ABSTRACT

A turret lathe table having tool holders arranged on at least three concentric reference circles around the center of the table. The tool holders consist of first tool holders for drill tools and inner turning tools and second tool holders for outer turning tools. The first tool holders are arranged exclusively on the innermost and at least one intermediate reference circle, while the second tool holders are arranged only on the outermost reference circle. The spacing between the tool holders is such that a collision-free diameter remains between adjacent tool holders, the collision-free diameter being defined as a diameter equivalent to a workpiece of maximum dimensions capable of being machined by a respective tool in a respective tool holder without interference from tools in adjacent tool holders.

2 Claims, 2 Drawing Sheets

TABLE OF TURRET LATHE

This application is a continuation-in-part application of patent application Ser. No. 511,349, filed May 20, 1983, aban Aug. 2, 1986.

BACKGROUND OF THE INVENTION

The invention relates to a tooled turret lathe table, the turret lathe table comprising means for holding boring tools as well as for holding inner and outer turning tools.

It is known in such turret lathe tables to arrange means for holding tools with uniform angular spacing. The angular spacing between the means for holding tools is determined by the so-called "collision-free diameter" between two tools. This diameter is equal to the diameter of the largest workpiece that can be machined without producing interference with the workpiece.

It is known to arrange the means for holding tools on two reference circles in such turret lathe tables. In this case the tips of the outer turning tools are situated on a first flying circle and the centers of the boring tools on a second flying circle.

If the number of tools and means for holding tools respectively, must be increased, the diameter of the table must necessarily also be increased. But increasing the table diameter results in difficulty with the components around the table.

It is the aim of the invention to improve the turret lathe table of the kind mentioned above such that a maximum number of tools can be held on as small a diameter table as possible.

SUMMARY OF THE INVENTION

This problem is solved in accordance with the present invention by arranging the means for holding the tools on at least three reference circles which are concentric to the center of the turret lathe table. The tool holding means are equipped with tools the tips of which define different flying circles. The tool holding means of a certain reference circle are equipped only with one type of tool, i.e. either drills or inner turning tools, or outer turning tools, respectively so that the tools of the tool holding means of each reference circle define one flying circle each, since each individual tool can only pertain to one flying circle and each tool holding means can pertain to only one reference circle.

On the outermost reference circle there are arranged tool holding means of the type which are exclusively suitable for receiving outer turning tools. On all inner reference circles there are tool holding means which are exclusively suitable for receiving drills or inner turning tools. The essential difference between drills and inner turning tools on one hand, and outer turning tools on the other, consists in that the centers of the respective collision-free diameters which have to be adhered to by the individual tools, have to be drawn from the tips of the respective tools. In frontal view of a turret lathe table, in the case of drills and inner turning tools this is simultaneously the center of the corresponding tool holding means, but in the case of outer turning tools it is the tip of the outer turning tool which does not coincide with the center of the corresponding tool holding means.

When constructing a turret lathe table the collision-free diameter, i.e. the minimum distance of the tip of the respective tool to the adjacent tools has to be given, as well as the number of tool receiving means on the innermost reference circle, which depends on the total number of tool receiving means intended to be on the turret lathe table. If one starts with the most common case of three tool receiving means on the innermost reference circle, the minimum required diameter of this innermost reference circle results from the predetermined collision-free diameter which these three tool holding means have to observe with respect to each other on the inner reference circle. The second reference circle located further out contains the same number of tool holding means as the innermost reference circle; and the tool holding means of the second reference circle are respectively located on the mid-verticals or median perpendiculars on a straight line through the centers of two tool holding means of the innermost reference circle, and they have to observe with respect thereto at least the minimum required collision-free diameter. Therefore, this determines the diameter of this second reference circle.

The tool holding means of the innermost, first reference circle and the second reference circle located radially further outwardly can be determined directly as described above, since these tool holding means are destined for receiving exclusively tools in which the tip of the tool coincides with the center of the tool holding means, so that the collision-free diameter can be drawn directly from the centers of the respective tool receiving means. If the then following third reference circle is intended to be the outermost reference circle of the turret lathe table, on this third reference circle tool holding means are arranged which are exclusively reserved for receiving outer turning tools. Therefore, the positions of the tool holding means of this third reference circle cannot be determined directly but first the positions of the tips of the outer turning tools to be arranged in these tool holding means have to be determined. These tips of the outer turning tools are located on the mid-verticals on straight lines through the centers of two adjacent tool holding means, of which one is located on the innermost and the other on the second reference circle. While thus observing the required collision-free diameters the positions of the tips of the outer turning tools on the above mentioned mid-verticals are determined. Since the spacing of the tool holding means from the tips of the outer turning tools arranged therein are known, the tool holding means for the outer turning tools are located by this amount radially inwardly of the determined positions for the tips of the outer turning tools. Thus, also the third reference circle for the locations of the tool holding means of the outer turning tools is determined. This will result in an unequal angular distribution of the outer turning tools, but on the other hand will result in a very compact arrangement of the tool holding means on a turret lathe table while maintaining the required collision-free diameters.

In case the turret lathe table should contain more than three reference circles for tool holding means, on the third reference circle also only tool holding means should be arranged which are capable of receiving drills and inner turning tools. In this case the already determined positions for the tips of the tools located in the tool holding means of the third reference circle are simultaneously the positions for the tool receiving means of this third reference circle. In an analogous manner, the next reference circle located further outwardly would have to be determined. The discrepancy between the tips of the outer turning tools and the positions for the corresponding tool holding means occurs only for the outermost reference circle, as described above in connection with a turret lathe table with three reference circles.

It should be observed that the determination of the positions of the individual tool holding means on the different reference circles in the manner described above, while maintaining the required collision-free diameter, is guaranteed only if one adheres to the use of the type of tools described above, namely outer turning tools in the outermost reference circle and inner turning tools or drills in the tool holding means of the reference circles located further inwardly from the outermost reference circle. It is, therefore, not possible to insert for instance in the tool holding means of the inner reference circles outer turning tools, or to place in the tool holding means of one and the same reference circle different type tools.

Placing the tools and means for holding tools on at least three reference circles in the manner specified results in an extremely compact arrangement, in which the tools and means for holding tools are not at equal angular distances apart with reference to the center of the table, but this is of no disadvantage in a numerically controlled machine tool, yet the diameter of the turret lathe table is considerably reduced in comparison to a conventional one having the same number of tools.

The arrangement of the means for holding tools can, of course, also be on more than three reference circles, in which case the means for holding outer turning tools will be on the outermost reference circle.

BRIEF DESCRIPTION OF THE DRAWING

The invention will be explained below by way of example in conjunction with FIGS. 1 to 3, in which.

DETAILED DESCRIPTION OF PREFERRED EMBODIMENTS

Figure 1:
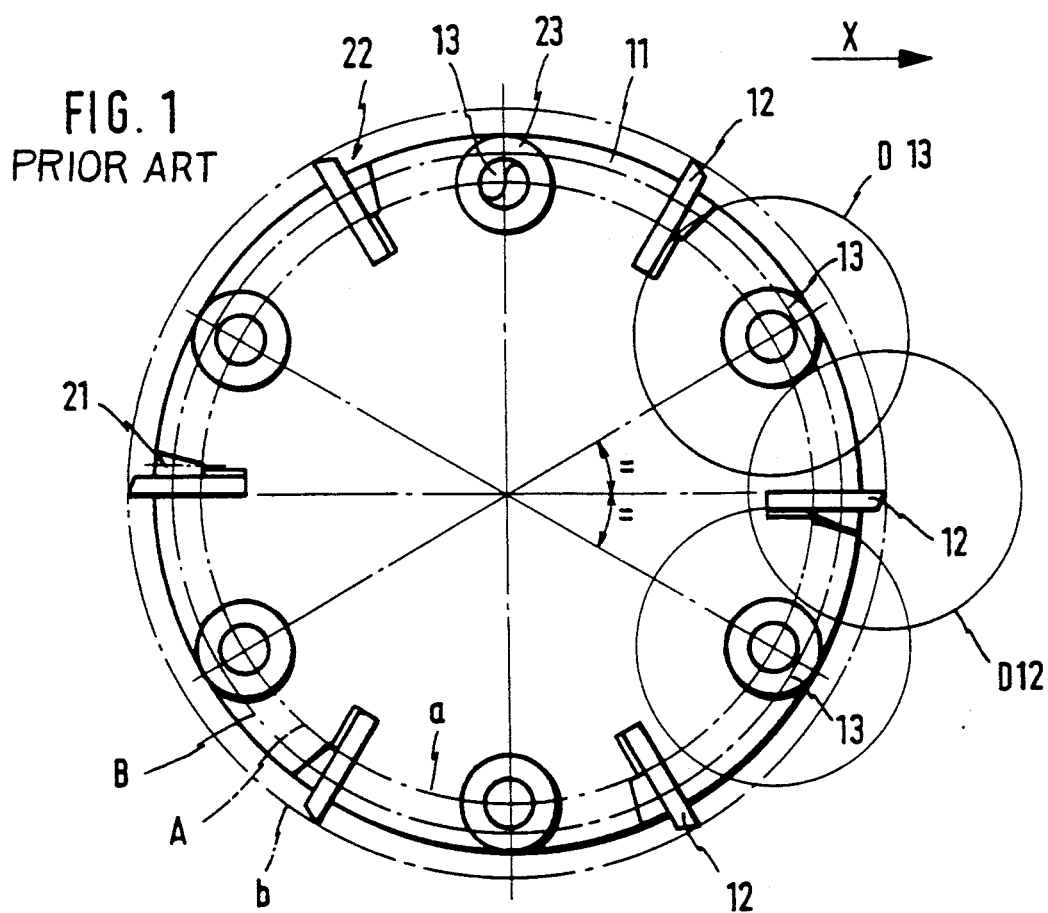
FIGS. 1 and 2 show known turret lathe tables.
Figure 2:
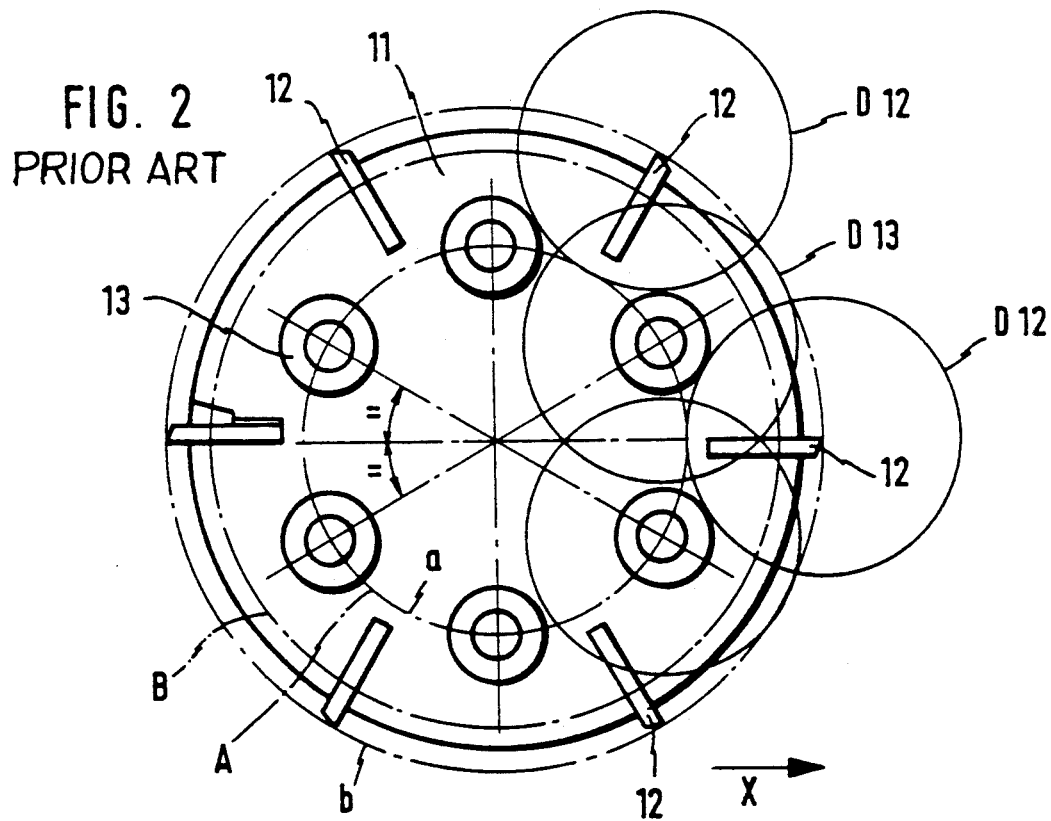
Figure 3:
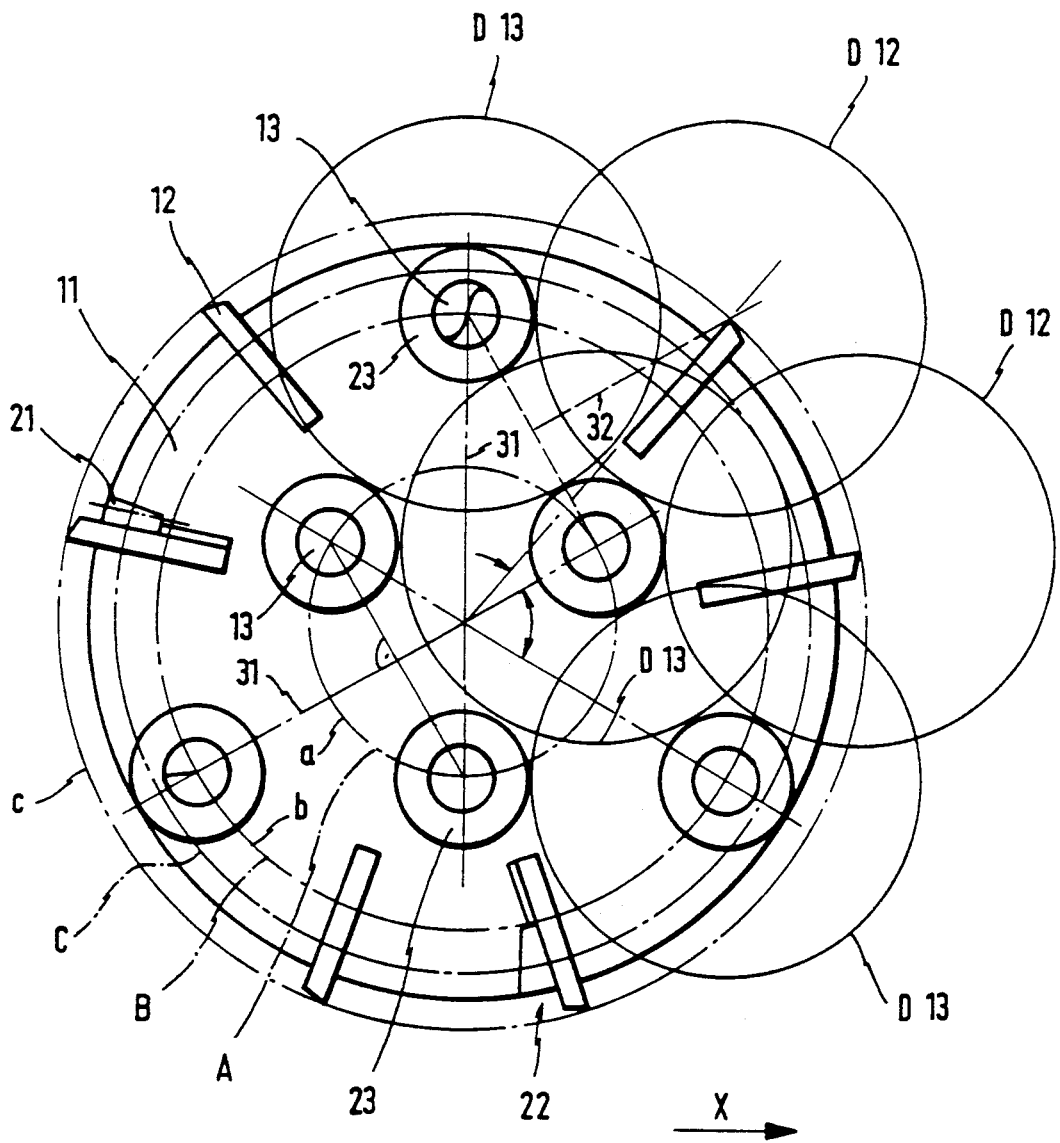
FIG. 3 shows the turret lathe table of the invention.

In FIGS. 1 to 3 the means for holding tools, in which boring tools or inner turning tools 13 can be inserted, have the reference number 23 and the means for holding tools, in which only outer turning tools 12 can be inserted, have the reference number 22.

In the turret lathe table 11 in FIG. 1, the outer turning tools 12 and the inner turning tools and boring tools 13 are alternated with one another at equal angular distances. The angular separation between two tools is in this case the angular separation between the tips of the tools.

In the front view of the turret lathe table 11, as shown in all FIGS. 1 to 3, in the case of boring tools or inner cutting tools 13, the tips of the tools are congruent or identical with the centers of the corresponding means 23 for holding tools, and because of that also the reference circles A to C, which are defined by the means for holding tools, are congruent with the flying circles a to c, defined by the tips of the tools.

Between the tips of two inner turning tools 13 and the outer turning tools 12 a distance must be provided which corresponds to the collision-free diameter, which is equal to the largest possible diameter of a workpiece which can be worked without interference with the adjacent tools. In FIG. 1, this collision-free diameter around an outer turning tool 12 is identified by D12.

As is indicated by the same collision-free diameter D13 around an inner turning tool 13, the distance between two inner turning tools 13 is greater than necessary, so that a large table diameter is the result. The tips of the inner turning tools 13 and the tips of the outer turning tools 12 in this turret lathe table are located on different flying circles a and b.

In that case the flying circle a is congruent with the reference circle A, as in that front view the centers of the means for holding tools 23, are congruent with the tips of the inserted boring tools or inner turning tools 13.

As this is not the case in connection with outer turning tools 12, which are mounted within means 22 for holding such tools, for example by clamping chocks 21, the means 22 for holding outer turning tools 12 in FIG. 1 define a reference circle B, and tips of the inserted outer turning tools 12 define a concentric flying circle b, which is not identical with the reference circle B.

FIG. 2 shows another known embodiment, in which in order to reduce the wheel diameter, means 23 for holding tools are offset inwardly with respect to the embodiment in FIG. 1. The inner and outer turning tools 13 and 12 respectively are located in this embodiment on two flying circles a and b, as the corresponding means 23 and 22 respectively for holding tools are located on two different reference circles B and A, respectively.

FIG. 3 shows an embodiment of the turret lathe table according to the present invention. In this embodiment the means for holding tools 22, 23 respectively are arranged on three reference circles A, B and C which are concentric with respect to each other and with respect to the center of the turret lathe table 11. As a starting point it was decided to provide three tool holding means 23 on the innermost reference circle A. These three tool holding means 23 are arranged at equal angular intervals on the lathe table 11. The diameter of this innermost reference circle A is selected such that between the three tool holding means, starting from their center points, the collision-free diameter D13 is respectively observed.

On the second, intermediate reference circle B there are arranged again, three tool holding means 23 corresponding to the number of tool holding means 23 on the inner reference circle A. They are arranged in such a way that they are located respectively on mid-verticals or median perpendiculars 31 on a straight line between two tool holding means 23 on the innermost reference circle A. The diameter of the second reference circle B is determined by the fact that again, measured from the center of each tool holding means 23 on reference circle B the collision-free diameter D13 has to be observed relative to the two adjacent tool holding means 23 located on the innermost reference circle A.

Since in fixing the position of the tool holding means 23 on the two reference circles A and B the assumption was that the collision-free diameter is D13, the center of which coincides in the front view of FIG. 3 with the center of the tool holding means 23, only tools the tips of which coincide with the center of the tool holding means 23 may be introduced into the tool holding means 23 of reference circles A and B. Therefore, only drills or inner turning tools may be placed in the tool holding means 23 of reference circles A and B. The reason for this is that upon insertion of outer turning tools as center of the collision-free diameter the tip of the outer turning tool would have to be used, which however no longer coincides with the center of the tool holding means 23. Therefore, since the tool receiving means 23 of the reference circles A and B only tools 13 can be inserted the tips of which coincide with the centers of the tool receiving means 23, the tips of the tools 13 which are inserted in the tool holding means 23 of the inner reference circle A, have a flying circle a which coincides with the reference circle A. In a similar manner, the tips of the tools 13 which are in the tool holding means 23 of intermediate reference circle B, define a flying circle b which likewise coincides with the reference circle B.

Furthermore, on the turret lathe table 11 of the present invention there are now tool holding means 22 which are exclusively suitable for the reception of outer turning tools 12. These tools 12 are for instance held in the tool holding means 22 by means of the above mentioned clamping chocks 21 which are screwed against the turret lathe table 11. Tool holding means 22 are arranged on a third outer reference circle C. The diameter of circle C, as well as the angular location of the individual tool holding means 22 on reference circle C are determined as follows: the outer turning tools 12 inserted into the tool holding means 22 have to observe again a collision-free diameter D12 with reference to all adjacent tools. The size of this diameter D12 is identical with the collision-free diameter D13, however its center is respectively the tip of an outer turning tool 12, and therefore does not coincide with the center of the respective tool holding means 22. In order to guarantee retention of the collision-free diameter D12 by the outer turning tools 12, the tips of the outer turning tools 12 have to be respectively located on the mid-verticals 32 of a straight line connecting the centers of two tool holding means 23, of which respectively one is located on the inner reference circle A and the other is the next adjacent tool receiving means on the intermediate reference circle B. Since the size of the collision-free diameter D12 is ordinarily a given quantity determined by the structural design of the turret lathe table 11 and the tips of the outer turning tools 12 in the tool holding means 22 of the outer reference circle C should have as small a distance from the center of the table 11 as possible, the positions of the tips of the outer turning tools 12 are determined in this manner. The tips of the outer turning tools 12 held in the tool holding means 22 of the outermost reference circle C define an outer flying circle c. Starting with the size of the flying circle c and the position of the individual tips of the outer turning tools 12 on this flying circle c, as well as the radial distance of the tips of the outer turning tools 12 from the respective turning tool holding means 22, the outer reference circle C is thus determined, on which the tool holding means 22 are located and which are suitable for reception of the outer turning tools 12. Since the outer reference circle C as well as the tool holding means 22 located thereon, as far as observance of the collision-free diameter D12 is concerned, was considered the starting point for the outer turning tools 12, these tool holding means 22 can be used exclusively for outer turning tools 12 but not for instance for drills, since in this case the observance of the required collision-free diameter cannot be guaranteed. A comparison with the known turret lathe tables of FIGS. 1 and 2 shows that the table 11 according to the invention represented in FIG. 3 has a smaller diameter while accommodating the same number of tool holding means. This is based on the location of the tips of the outer turning tools 12 on the mid-verticals 32 between the centers of two tool receiving means 23 which are located on different reference circles A and B. This does result in a different angular distance of the outer turning tool 12 to two adjacent tools 13 or tool holding means 23, however, this distribution of the outer turning tools 12 on the circumference of the turret lathe table 11 at unequal angular intervals does not present a problem when using the table 11 on present day machine tools.

In a similar manner a turret lathe table may be constructed with tool holding means which are arranged on more than three reference circles: reference circles A and B as well as the position of the tool holding means 23 arranged thereon are determined in the same manner as described above. In the case of a turret lathe table with four reference circles A to D tool holding means 23 are arranged on the reference circle C, which are exclusively suitable for receiving drills or inner turning tools 13. As a consequence, the flying circle c would be determined as described above, but the reference circle C of the respective tool holding means would coincide with the flying circle c, just as with the reference circles located further in. The outermost flying circle d would again be determined by the location of the tips of the outer turning tools 12 determining this outermost flying circle d on the mid-verticals of a line connecting the centers of two adjacent tool holding means 23, of which one each would be located on reference circle B and on reference circle C, while again the collision-free diameters D12 have to be observed. Starting from the minimum size of the outermost flying circle d determined in this manner, again the outermost reference circle D for the tool holding means 22 could be determined.

In accordance with the present invention, a more compact arrangement of the tool holding means or tools respectively on a turret lathe table can be achieved when compared with the heretofore known turret lathe tables in which the tools had an equal angular distribution on the individual reference circles, with respect to the center of the turret lathe table.

We claim:

1. A turret lathe table having a center, comprising: means for holding tools, arranged on at least three concentric reference circles on said table around said center, including an innermost reference circle of a first diameter, an outermost reference circle of a second diameter larger than said first diameter, and at least one intermediate reference circle of a diameter between said first and second diameters; said means for holding tools comprising first tool holding means for holding drill tools and inner turning tools and a second tool holding means for holding outer turning tools; a predetermined number of said first tool holding means being arranged on said innermost reference circle, and a predetermined number of first tool holding means being arranged on said at least one intermediate reference circle, a predetermined number of said second tool holding means being arranged on said outermost reference circle; said tool holding means being arranged on said reference circles with a spacing such that a collision-free diameter remains between adjacent tool holding means, said collision free diameter being defined as a diameter equivalent to a workpiece of maximum dimensions capable of being machined by a respective tool in a respective tool holding means, without interference from tools in adjacent tool holding means; said first tool holding means on said at least one intermediate reference circle being located on a median perpendicular of a straight line connecting two adjacent first tool holding means on said innermost reference circle and having the same angular spacing from each other; said second tool holding means being arranged on said outermost reference circle such that tips of tools in said second tool holding means are located on mid-verticals on a straight line connecting two adjacent first tool holding means on said at least one intermediate reference circle, whereby the second tool holding means will have unequal angular distance with respect to each other and with respect to the center of the turret lathe table.

2. A turret lathe table having a center, comprising: means for holding tools, arranged on three concentric reference circles on said table around said center, including an innermost reference circle of a first diameter, an outermost reference circle of a second diameter larger than said first diameter, and an intermediate reference circle of a diameter between said first and second diameters; and means for holding tools comprising firs tool holding means for holding drill tools and inner turning tools and second tool holding means for holding outer turning tools; said first tool holding means being arranged only on said innermost and said at least one intermediate reference circles, said second tool holding means being arranged only on said outermost reference circle; said tool holding means being arranged on said reference circles with a spacing such that a collision-free diameter remains between adjacent tool holding means, said collision free diameter being defined as a diameter equivalent to a workpiece of maximum dimensions capable of being machined by a respective tool in a respective tool holding means, without interference from tools in adjacent tool holding means; three first tool holding means being arranged on said innermost reference circle; three first tool holding means being arranged on said intermediate reference circle, with said first tool holding means on said intermediate reference circle being located on a median perpendicular of a line connecting the centers of two adjacent first tool holding means on said innermost reference circle; six second tool holding means being arranged on said outermost reference circle such that tips of outer turning tools in said second tool holding means are positioned on median perpendiculars of a line connecting the centers of adjacent two first tool holding means, of which one is located on the innermost reference circle and the other on the intermediate reference circle, whereby the second tool holding means will have unequal angular distances with respect to each other and relative to the center of the turret lathe table.

* * * * *